Figure 1:
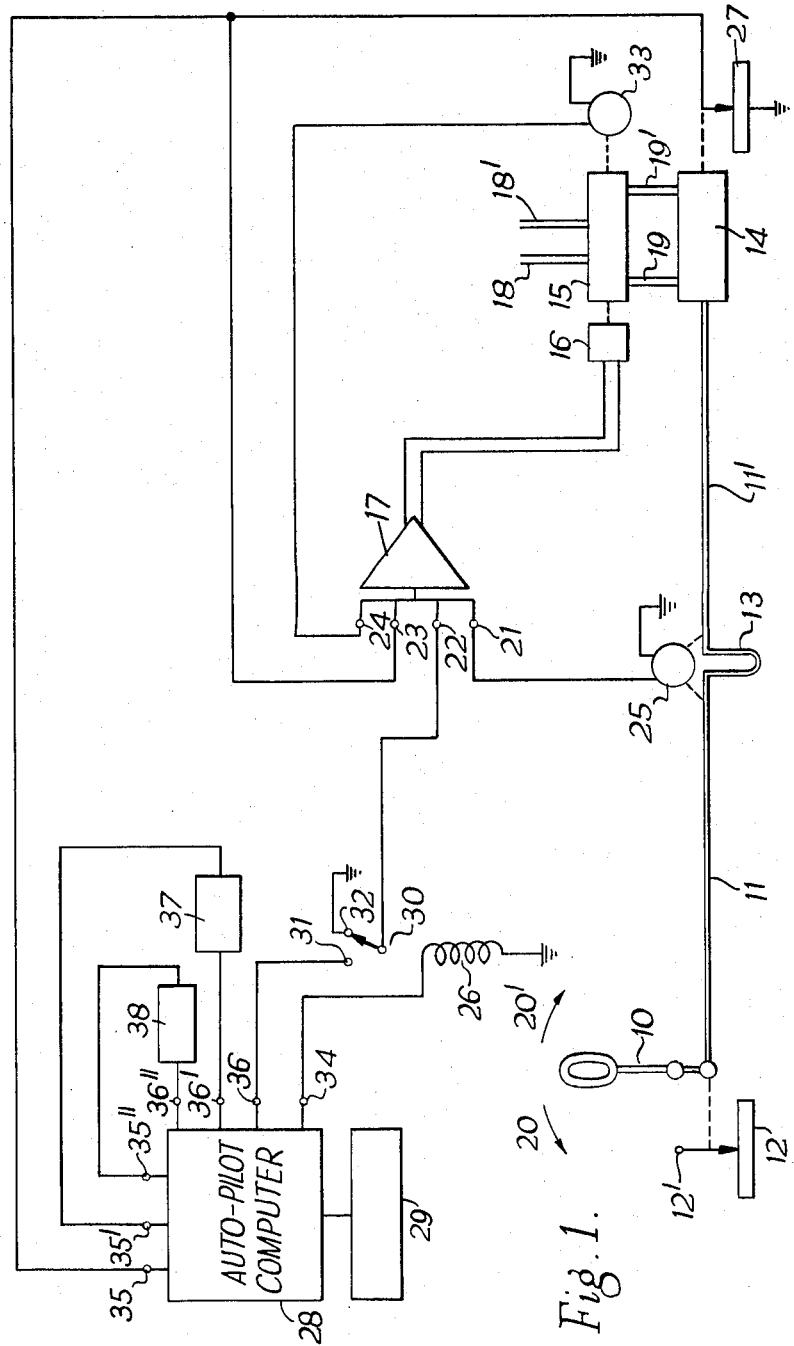

June 28, 1966  B. E. LONGLEY  3,258,517

GROUND BASED FLIGHT TRAINING APPARATUS

Filed July 19, 1962  2 Sheets-Sheet 1

United States Patent Office 3,258,517
Patented June 28, 1966

3,258,517
GROUND BASED FLIGHT TRAINING APPARATUS
Bernard Edgar Longley, Ifield, Sussex, England, assignor to Communications Patents Limited, London, England
Filed July 19, 1962, Ser. No. 210,907
Claims priority, application Great Britain, Aug. 2, 1961, 28,006/61
6 Claims. (Cl. 35—10.2)

This invention relates to ground based flight-training and flight-simulating apparatus in which aircraft controls normally operable by a trainee pilot are operated automatically when a simulated auto-pilot is brought into use.

It is known to employ electro-mechanical devices to provide loading of the flying controls of flight training and simulating apparatus. The operation of these devices is determined by electric signals obtained from force and displacement responsive units associated with a control loading system and from the computer of the apparatus.

In some types of flight training and simulating apparatus, it is desirable to simulate effects corresponding to those which occur when an aircraft is flying under the control of an auto-pilot. In known apparatus of this kind, it is the practice to include, in the control loading system, separate mechanisms which determine the movement of the flying controls whenever a simulated auto-pilot is brought into use. These mechanisms are also controlled by electric signals derived from the flight computer of the apparatus.

It is an object of the present invention to provide, in flight training apparatus incorporating a control loading system, means whereby the operation of an aircraft under the control of an auto-pilot is simulated, without the use of separate mechanisms to actuate the flying controls when they are coupled to the auto-pilot.

It is a further object of the invention, to provide in flight training apparatus incorporating a control loading system and simulating operation under the control of an auto-pilot, a computer which is less complex than that associated with a normal auto-pilot.

Accordingly the present invention provides ground based flight training or simulating apparatus having manually operable flight controls, computing apparatus for simulating auto-pilot control and switch means for selecting alternatively solely manual operation of the flight controls or auto-pilot control, said flight training or flight simulating apparatus providing simulated loading of the flight controls when manually operated during simulated flight, comprising motor means having an output member connected to displace a flight control on auto-pilot operation, said motor means providing a controllable load where reversely driven by said output member.

Figure 2:
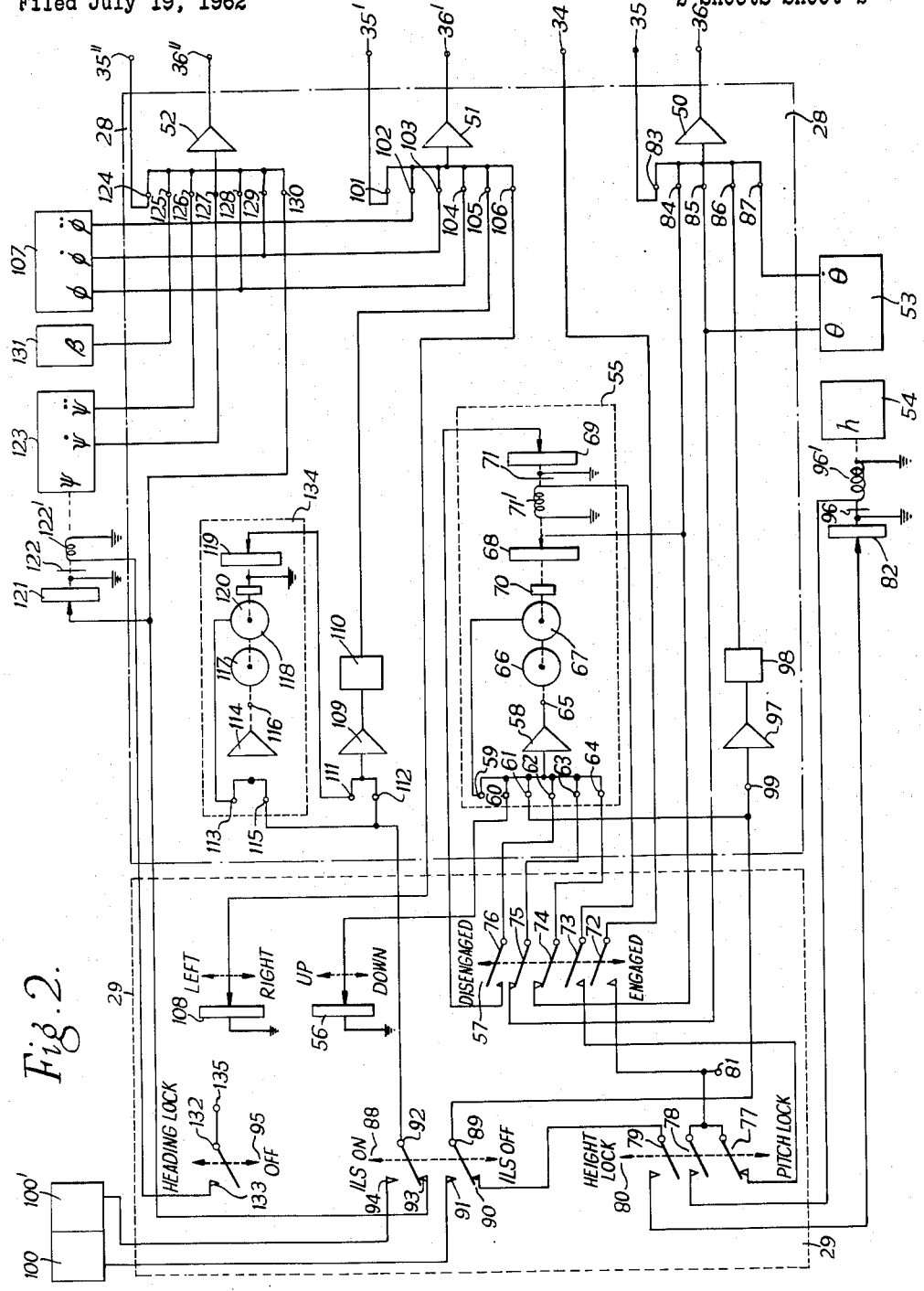

In order that the invention may be readily understood and carried into effect, one embodiment thereof will now be described in detail, by way of example, with reference to the accompanying drawings, in which:

FIG. 1 shows, in diagrammatic form, a control loading system providing manual or manual/auto-pilot operation of the elevator control of a flight simulator; and FIG. 2 shows, in schematic form, a simulated auto-pilot computer providing output signals which are used to determine the movement of simulated elevator, aileron and rudder controls.

In the system according to FIG. 1, an elevator control 10 is connected to control a potentiometer 12. The elevator control 10 is also connected, by way of rods 11 and 11', and an intermediate resilient U-beam coupling 13, to the ram of an hydraulic jack 14. The potentiometer provides, at terminal 12', a signal which is supplied to the pitch computing system of an associated flight simulator. The jack 14 provided the movement and introduces the resistance to displacement of the elevator control 10. The jack 14 is supplied with oil, via a hydraulic valve 15, which is actuated by an electrodynamic unit 16 connected to the output of an amplifier 17. The valve 15 is connected to a hydraulic system, which is not shown, by way of pipes 18 and 18' and to the jack 14 by way of pipes 19 and 19'.

Oil under pressure is supplied to the valve by pipe 18 and is returned to the system by pipe 18'. When the valve is actuated, oil is passed to and from the jack via pipes 19 and 19' respectively, tending to move the control 10 in the direction of the arrow 20, or to and from the jack via pipes 19' and 19 respectively, tending to move the control 10 in the direction of the arrow 20'.

Alternating current electric signals are applied to terminals 21, 22, 23 and 24 connected to the input of amplifier 17 via summing resistors, not shown.

The signal fed to the terminal 21 is derived from a displacement transducer 25 fed from a source of alternating current used to supply the computing systems of the associated flight simulator. The transducer is coupled mechanically across the jaws of the U-beam coupling 13, in a manner to produce output signals of respectively opposite phase relationship as the jaws of the transducer are opened or are closed respectively by operation of the rods 11, 11'. The output voltage varies linearly with the distortion of the U-beam coupling and hence is proportional to the force applied by the pilot to the control 10.

The signal fed to the terminal 23 is derived from the wiper of a centre-tapped potentiometer 27. The amplitude of the signal from potentiometer 27 increases from zero linearly, or alternatively according to a predetermined non-linear law, when the ram of the jack 14 is displaced from a neutral position. The winding of the potentiometer 27 is fed from the same source of alternating current as the transducer 25, to provide signals of relatively opposite phase relationship when the wiper is displaced to one side or to the other of the centre-tap respectively.

The signal from the wiper of the potentiometer 27 is also fed to a simulated auto-pilot computer 28 by way of terminal 35. The computer 28, which is described in detail later in the specification, provides signal outputs at terminals 36, 36' and 36". These three signals are used to determine the automatic operation of the elevator control loading system, the aileron loading system 37, and the rudder control loading system 38, respectively.

The signal at terminal 36 is fed to terminal 22 via contacts 30 and 31 of a relay 26. The contacts 30 and 31, are closed when a switch in the controller 29, associated with the computer 28, is operated to engage the auto-pilot. Contacts 30 and 32 of the relay 26 are closed to connect the terminal 22 to earth when the auto-pilot is disengaged. The coil of the relay 26 is connected, via terminal 34 to the computer 28.

The signal fed to the terminal 24 is derived from a transducer 33 which is connected to the source of the alternating current used to supply the computing system of the simulator. The transducer 33 is coupled mechanically to the valve 15 to provide output signals of relatively opposite phase relationship when the valve is displaced in opposite directions from a neutral position.

The valve 15 is actuated by a control unit which is fed by the amplifier 17 with direct currents of opposite polarity corresponding to opposite directions of displacement of the valve 15. The amplifier is of conventional design and the A.C. signals present at the input terminals are fed, after voltage amplification, to a phase sensitive rectifier. The rectified signals are then fed, after power amplification, to the control unit 16. The polarity of the D.C. signal at the output of the amplifier 17 is determined by the phase relationships of the A.C. signals present at the input of the amplifier and the direction of displacement of the valve 15 is therefore determined in this way.

The signals fed to the terminals 21 and 22 are in antiphase with the signal fed to terminal 23. The values of the summing resistors are chosen to make the input to the amplifier substantially zero when the control 10 is displaced by a pre-determined amount corresponding to the force exerted by the pilot, or alternatively when the control 10 is displaced to a position computed by the autopilot. Since the rate of travel of the jack 14 increases with the increasing opening of the valve 15, it follows that the signal fed to the terminal 24 is a voltage approximately proportional to the velocity of the movement of the control 10. This signal therefore provides rate feedback and acts in the well-known way to stabilise the system against hunting.

Further control loading systems, similar to the elevator control loading system described, are provided for the aileron and rudder controls of the simulator. These systems are shown as units 37 and 38 respectively in the diagram. Displacement feedback signals from the aileron and rudder systems are fed to terminals 35′, 35″ respectively of the auto-pilot computer 28.

In some auto-pilot control systems, manual override facilities are not included. Where alternative manual or auto-pilot control is to be simulated, the modified form of the arrangement now to be described, is employed.

The relay 26 is provided with an additional set of changeover contacts and the connection from the wiper of the potentiometer 27, to the terminal 35, is omitted. A connection is made from the transducer 25 to the terminal 21, via these additional contacts, in the condition for manual operation. When the auto-pilot is engaged, the terminal 21 is connected to earth.

In the schematic diagram of FIG. 2, the auto-pilot computer and control units are shown within broken outlines bearing the references 28 and 29 respectively corresponding to FIG. 1. The input and output terminals of the computer similarly bear the references 35, 35′ and 35″ and the references 34, 36, 36′ and 36″ corresponding to FIG. 1. The terminals 36, 36′ and 36‴ are connected to amplifiers 50, 51 and 52 respectively. The amplifier 50 provides signals for the automatic operation of the elevator control loading system. The amplifiers 51 and 52 provide signals for the automatic operation of the aileron and rudder control loading systems, respectively.

The amplifier 50 has input terminals 83, 84, 85, 86 and 87 connected to the input of the amplifier 50 by way of summing resistors, not shown. To these terminals are fed signals derived from pitch and height computing systems 53 and 54 respectively of the flight simulator, from a pitch datum computing servo 55, and from the elevator control loading system via terminal 35. The terminal 35 is connected to terminal 83.

The pitch datum computing servo 55, shown within the broken outline, is fed with signals derived from the pitch and height computing systems of the simulator and from a potentiometer 56. The potentiometer 56 is situated in the controller unit 29 and is used as a pitch-trim control.

Signals are fed to the computing servo 55 via a multi-way switch 57, having contact pairs 72, 73, 74, 75, and 76, a multi-way switch 80 having contact pairs 77, 78 and 79, and a multi-way switch 88 having changeover contacts 89, 90 and 91, and changeover contacts 92, 93 and 94. The switches 57, 80 and 88 are situated in the controller unit 29.

The switch 57 has two positions corresponding to the conditions "auto-pilot engaged" or "auto-pilot disengaged." The switch 80 has two positions corresponding to conditions "pitch lock" or "height lock." The switch 88 has two positions corresponding to the conditions "Instrument landing system (ILS) On" and "ILS Off." The switches 80 and 88 are mechanically interlocked to permit the switch 88 to be set to the "ILS On" position only when the switch 80 is in the "height lock" position.

The computing servo 55 is of conventional design and includes an amplifier 58 having input terminals 59, 60, 61, 62, 63 and 64 feeding summing resistors, not shown, and having an output terminal 65 feeding a servo motor 66. The servo motor shaft drives a feedback generator 67, which provides a stabilising rate feedback signal to input terminal 59. The servo motor 66 also drives potentiometers 68 and 69, via a reduction gear 70. The potentiometer 69 is only driven by the reduction gear 70 when the winding 71′ of a magnetic clutch 71 is energised. The windings of the potentiometers are connected to the source of alternating current used to supply the computing system of the simulator. The potentiometer 69 has a centre tap which is earthed.

When the switch 57 is in the "auto-pilot disengaged" position, the contact pairs 74 and 75 are closed. A signal, corresponding to the pitch angle of the simulator and represented by $\vartheta$ is then fed from the pitch computing system 53, via the contact pair 75, to the amplifier input terminal 63. The potentiometer 68 provides, via the contact-pair 74, an "answer" signal at terminal 64 of opposite phase to that of the signal at terminal 63. The servo is arranged to take up a position such that the combined input to the amplifier always tends to become zero. Hence, the signal from the potentiometer 68 corresponds to the angle of pitch computed by the flight simulator.

When the switch 57 is set to the "auto-pilot engaged" position, the contact pairs 74 and 75 are opened and the contact pairs 72 and 73 are closed. The clutch coil 71′ is energised, via the contact pair 77 of the switch 80 and the contact pair 73 of the switch 57, by direct current from a source of supply connected to terminal 81. Terminal 34 is connected to terminal 81 via the contact pair 72.

Signals are fed to input terminal 60 of the amplifier 58 or to input terminal 61 of the amplifier 58 and to input terminal 99 of an amplifier 97, according to the setting of the controls 56 and 80.

In the "pitch lock" position, a signal from the wiper of potentiometer 56 is fed to terminal 60, when this potentiometer is used, for example, to trim the rate of climb or dive to a required value.

When the switch 80 is in the "height lock" position, and the switch 88 is in the "ILS Off" position, an error signal is fed, via closed contacts 89 and 90, to terminal 61. This error signal is obtained from the wiper of potentiometer 82 of the height computing system 54. This error signal is also fed, via the amplifier 97 and a limiter 98, to input terminal 86 of the amplifier 50.

The potentiometers 56 and 82 are connected to the source of alternating current used to supply the computing system of the flight simulator. These potentiometers have centre-taps, which are earthed, so that there is no output signal from their wiper when they are in a mid-position. A signal fed to terminal 60 or to terminal 61 is "answered" by a signal of opposite phase fed to terminal 62. This signal is obtained from potentiometer 69, via the closed contact pair 76.

Assuming the switch 80 is in the "pitch lock" position and the potentiometer 56 in a mid-position; at the instant of time at which the auto-pilot is engaged, no signals are present at terminal 60 or 61. The output signal of the wiper of the potentiometer 68, corresponding to the angle of pitch computed by the flight simulator, represents the angle of pitch the auto-pilot is required to maintain.

The signal from potentiometer 68 is fed to input terminal 84 of the amplifier 50 and is "answered" by signals of opposite phase, fed to terminals 85 and 83, representing respectively, the angle of pitch computed by the pitch system of the flight simulator and the displacement signal generated by the elevator control loading system. This displacement feedback signal is provided to improve the response of the system, by using high gain between the auto-pilot computer and the control loading system. This signal fed to terminal 87, corresponding to rate of pitch represented by $\dot\vartheta$, has a phase relationship, with respect to the signal fed to terminal 85, such that periodic changes of pitch angle are damped out, so as to stabilise the system. No signal is present at the input terminal 86 as the contact pair 79 of switch 80 is open. Fine adjustment of the pitch angle is made by adjustment of potentiometer 56.

When the computed pitch angle has the desired value, the sum of the voltages at the input of amplifier 50 is such that the sum of the voltages at the input of amplifier 17 of FIG. 1 is substantially zero. Hence, the auto-pilot computer tends to maintain the angle of pitch computed by the simulator constant.

Now, assuming the switch 80 to be set to the "height lock" position and the potentiometer 56 to be set to the mid-position and further assume the height computed by the simulator to be at the value which it is desired to maintain. The contact pair 77 is opened, the supply of current to the coil 71 is interrupted, the wiper of potentiometer 69 is at a mid-position and no signal is present at input terminal 62 of the amplifier 58. The contact pair 78 is closed and direct current from the source connected to terminal 81 is fed to coil 96' of a clutch 96. The potentiometer 82 is then coupled mechanically to the altitude servo of the height computing system 54, represented by $h$.

The winding of potentiometer 82 is provided with a centre-tap which is earthed. The winding is connected to the source of alternating current used to supply the computing system of the simulator, so as to provide signals of relatively opposite phase when the wiper is displaced to one side or the other of the centre-tap. At the time when the clutch 96 is engaged, the wiper of potentiometer 82 is at a mid-position. Any variation in the altitude computed by the simulator therefore produces, at the wiper of potentiometer 82, a signal corresponding to the difference between the computed height and the height it is desired to maintain. This error signal is fed to input terminal 61 of the servo amplifier 58 and to input terminal 99 of the amplifier 97. The servo 55 has no position feedback when the clutch 71 is disengaged, and an integrated output signal is therefore produced at the wiper of potentiometer 68. The phase of this signal is such that the angle of pitch produced by the combined input signals fed to terminals 84 and 85 is of a sign to correct any error in height.

The signal fed to terminal 99, after phase reversal in amplifier 97, is limited in unit 98 to a predetermined maximum amplitude. The phase of the signal is such that the angle of pitch produced by the signal fed to terminal 86 is of a sign to correct any error in height.

Thus the combined signal fed to the input of amplifier 50 maintains the simulated height at the desired value. The pitch angle is limited to a safe value.

When the switch 88 is set to the "ILS On" position, a signal is fed, via closed contacts 89 and 91 to input terminal 61 of the amplifier 58, from a glide path computer 100. The computer 100 forms a part of the computing system used to actuate the instrument landing system (ILS) of the flight simulator. The signal fed to terminal 61 is an error signal corresponding to the discrepancy, in the vertical plane, between the correct approach path and the actual approach path which is being followed during a simulated automatic approach.

The error signal fed to the amplifier 58 is integrated by the servo 55 and fed to input terminal 84 of amplifier 50. This signal corresponds to the angle of pitch needed to follow the glide path. The error signal fed to terminal 86, via the amplifier 97 and the limiter 98, is used to correct height.

Thus a condition is established where the combined inputs to the amplifier 50 tend to become constant to maintain the pitch angle at a substantially constant downward angle while the height is changing continuously.

The amplifier 51 has input terminals 101, 102, 103, 104, 105 and 106, connected to the input of the amplifier by way of summing resistors, not shown. To these input terminals are fed signals derived from a roll computing system 107 of the flight simulator, from a potentiometer 108 in the controller 29, from the output of an amplifier 109, via a limiter 110, and from the aileron control loading system 37 of FIG. 1, via terminal 35'. The potentiometer 108 is used to vary simulated heading.

The amplifier 109 has input terminals 111 and 112 connected to the input of the amplifier by way of summing resistors, not shown. To terminals 111 and 112 are fed signals from the output of a computing servo 134 and from azimuth or lateral displacement computing systems 123 and 100' according to the position of the switch 88.

The computing servo 134 is of conventional design and functions as an integrator. In servo 134, input terminals 113 and 115 are connected, by way of summing resistors, not shown, to the input of an amplifier 114.

The amplifier 114 has an output terminal 116 feeding a motor 117. The shaft of the motor drives a feedback generator 118, which provides a stabilising rate feedback signal to the input terminal 113. Input terminal 115 is fed with the same signal as is fed to input terminal 112 of amplifier 109. The shaft of the motor 117 also drives a potentiometer 119, via a speed reduction gear 120. The wiper of potentiometer 119 is connected to terminal 111 of amplifier 109.

With the switch 88 in the "ILS Off" position, the amplifier input terminals 112 and 115 are connected, via closed contacts 92 and 93, to the wiper of a potentiometer 121 of the azimuth computing system 123. The winding of the potentiometer 121 is provided with a centre tap which is earthed and the winding is connected to the source of the alternating current used to supply the computing system of the simulator. The potentiometer 121 is coupled to the azimuth computing system 123 of the flight simulator, represented by $\psi$, when a clutch 122 is engaged.

Assuming the wiper of the potentiometer 121 to be at the mid-position and the clutch to be disengaged: No signal is fed to the amplifier input terminals 112 and 115 and no signal is fed to terminal 105 of amplifier 51, therefore. The winding of the potentiometer 108 is provided with a centre tap which is earthed. The winding is connected to the source of alternating current used to supply the computing system of the simulator, so as to provide signals of relatively opposite phase, corresponding to positive and negative roll angles, when the wiper is displaced to one side or the other of the centre tap.

A signal is fed to terminal 106 of the amplifier 51 from the wiper of potentiometer 108. This signal is "answered" by signals of opposite phase fed to terminals 104 and 101, corresponding respectively to the angle of roll computed by the roll system of the flight simulator, represented by $\phi$, and the displacement signals generated by the aileron loading system. Signals corresponding to roll velocity, represented by $\dot{\phi}$, and roll acceleration, represented by $\ddot{\phi}$, are fed to input terminals 103 and 102 respectively. The phase relationship of these signals with respect to the signals fed to terminal 106 is such that periodic changes of roll angle are damped out in order to stabilise the system.

When the computed roll angle has the desired value, the sum of the voltages at the input of amplifier 51 is such that the input to the amplifier of the aileron control loading system 37 is substantially zero. The auto-pilot computer tends to maintain the angle of roll computed by the simulator at a value determined by the setting of the potentiometer 108.

In an actual aircraft, the rudder control is normally used to inhibit sideslip. The amplifier 52 is thus used to provide a signal to the rudder control loading system to satisfy this condition.

The amplifier 52 has input terminals 124, 125, 126, 127, 128, 129 and 130, connected to the input of the amplifier by way of summing resistors, not shown. To these input terminals are fed signals derived from a transverse velocity computing system 131 of the flight simulator, from the roll and azimuth computing systems 107 and 123 respectively, from the potentiometer 121 and from the rudder control loading system 38 of FIG. 1.

Assuming the wiper of potentiometer 121 to be at the mid-position, so that no signal is fed to terminal 130: A roll angle signal is fed from the computing system 107 to the input terminal 128 and this signal is "answered" by a rate of turn signal, of opposite phase, represented by $\dot{\psi}$, fed from the computing system 123 to the input terminal 127. A displacement signal generated by the rudder control loading system is fed to input terminal 124. From the computing system 131, a signal which corresponds to sideslip angle, represented by $\beta$, is fed to input terminal 124. The phase of this signal is such that the movement of the rudder control loading system produced thereby, is in a direction to reduce sideslip angle. Signals corresponding to turning acceleration, represented by $\ddot{\psi}$, and roll velocity $\dot{\phi}$, are fed to input terminals 126 and 129 respectively. The phase relationship of these signals is such that periodic changes in the rate of turn are damped out in order to stabilise the system.

The rate of turn is constant when the sum of the signal inputs to the amplifier 52 is constant and there is no sideslip. The auto-pilot computer tends to maintain the rate of turn computed by the simulator at a constant value.

When the simulated heading is to be held at a constant value, an "ON/OFF" switch 95, having contacts 132 and 133 is set to the "ON" position corresponding to "heading lock." In this position, the contacts 132 and 133 are closed and a coil 122' of the clutch 122 is energised with direct current obtained from a source of supply connected to terminal 135. The potentiometer 121 is coupled mechanically to the azimuth servo of the computing system 123.

The output from the wiper of the potentiometer 121 is a signal corresponding to the error between the actual heading and the simulated heading at the time the switch 131 is closed. The error signal is fed to input terminals 112 and 115 of the amplifiers 109 and 114 respectively, and to input terminal 130 of amplifier 52.

The error signal at input terminal 112 of amplifier 109 is summed with the signal fed to terminal 111. The combined signal, after amplification, is limited to a predetermined maximum amplitude in unit 110 and is fed to input terminal 105 of amplifier 51. The signal fed to terminal 105 produces simulated roll, in a manner already described, in a direction to cause the heading to change in a direction to reduce the error. When the error signal fed to input terminals 112 and 115 is small, but is maintained for an appreciable period of time, the integrator 134 functions to feed an input signal to amplifier 109 of sufficient magnitude to produce a change of heading and of phase to reduce the error.

Switches 88 and 95 are mechanically interlocked to permit the switch 88 to be set to the "ILS On" position only when the switch 95 is in the "OFF" position. Assuming the switch 95 to be set to the "OFF" position and the switch 88 to be set to the "ILS On" position: The pitch system of the auto-pilot computer is supplied with signals from the computing system 100 to control the simulated approach, in the manner described earlier in the specification. The contacts 92 and 94 of the switch 88 are closed and a signal is fed to the amplifiers 109 and 114 from a lateral displacement computer 100', which is a part of the ILS computing system. This signal is an error signal corresponding to the discrepancy in the horizontal plane between the correct approach path and the actual approach path which is being followed during a simulated automatic landing.

The error signal from amplifier 109 is fed to amplifier 51, via the limiter 110. Simulated roll is produced in a direction to cause the heading to be corrected in the manner described in relation to the heading lock condition.

Signal outputs from radio navigation aids of other types may be included with corresponding minor alterations to the auto-pilot computer.

What I claim is:

1. A ground-based flight simulating apparatus comprising manually operable flight controls, computing apparatus for simulating auto-pilot control, switch means for selecting alternatively one of solely manual operation of the flight controls and auto-pilot control, motor means having an output member connected to displace a flight control on auto-pilot operation and means connected to said motor means for providing a controllable load when said motor means is reversely driven by said output member so that said flight training or flight simulating apparatus provides simulated loading of the flight controls when manually operated during simulated flight.

2. A ground-based flight simulating apparatus as claimed in claim 1 and further comprising a control force responsive element connected between said flight control and said motor means to provide a loading signal corresponding to the instantaneous loading on said flight control provided by said motor means, and a displacement responsive element for providing a displacement signal corresponding to the displacement of said motor output member from a neutral position, said motor means being controlled in response to said loading signal, said displacement signal and a signal corresponding to demanded flight control displacement provided by said auto-pilot computer.

3. A ground-based flight simulating apparatus as claimed in claim 2, wherein said motor means comprises a hydraulic motor, a hydraulic valve connected to supply said hydraulic motor, and a valve controller responsive to a control signal derived from said loading, displacement and displacement demand signals, connected to said hydraulic valve to control the same.

4. A ground-based flight simulating apparatus as claimed in claim 3, wherein said loading, displacement and displacement demand signals are electric signals, supplied with said electric signals a servo amplifier, the output of said amplifier being an electric control signal supplied to said controller for said hydraulic valve.

5. A ground-based flight simulating apparatus as claimed in claim 4, wherein said hydraulic valve has a displaceable valve member, a displacement responsive element connected to said displaceable valve member to provide a valve operation signal corresponding to said valve member displacement and means for supplying said valve operation signal to said servo amplifier together with said loading, displacement and displacement demand signals.

6. A ground-based flight simulating apparatus as claimed in claim 2, and further comprising a resilient member connecting the output member of said motor means to said flight control so that said loading signal corresponds to the distortion of said resilient member.

References Cited by the Examiner
UNITED STATES PATENTS

| | | | |
|---|---|---|---|
| 2,742,123 | 4/1956 | Exline | 91—459 |
| 2,947,285 | 8/1960 | Baltus et al. | 91—361 |
| 3,038,451 | 6/1962 | Sporn et al. | 91—361 |

MALCOLM A. MORRISON, *Primary Examiner.*

K. W. DOBYNS, *Assistant Examiner.*